United States Patent
Moriyama et al.

(10) Patent No.: US 10,386,592 B2
(45) Date of Patent: Aug. 20, 2019

(54) OPTICAL ENGINE AND OPTICAL MODULE

(71) Applicant: FUJITSU COMPONENT LIMITED, Tokyo (JP)

(72) Inventors: Satoshi Moriyama, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/150,426

(22) Filed: Oct. 3, 2018

(65) Prior Publication Data

US 2019/0129113 A1 May 2, 2019

(30) Foreign Application Priority Data

Nov. 1, 2017 (JP) .................................. 2017-211517

(51) Int. Cl.
*G02B 6/42* (2006.01)

(52) U.S. Cl.
CPC .......... *G02B 6/4284* (2013.01); *G02B 6/4269* (2013.01); *G02B 6/4272* (2013.01); *G02B 6/4281* (2013.01)

(58) Field of Classification Search
CPC .. G02B 6/4201; G02B 6/4266; G02B 6/4268; G02B 6/4269; G02B 6/4272; G02B 6/4281; G02B 6/4284; H01L 23/24
USPC ...... 385/88, 89, 92; 398/139, 200, 201, 212, 398/214
See application file for complete search history.

(56) References Cited

U.S. PATENT DOCUMENTS

| | | | | |
|---|---|---|---|---|
| 6,343,171 | B1 * | 1/2002 | Yoshimura | G02B 6/12002 385/50 |
| 7,182,526 | B1 * | 2/2007 | Wittl | G02B 6/43 385/88 |
| 7,209,621 | B2 * | 4/2007 | Glebov | G02B 6/322 385/129 |
| 7,229,221 | B2 * | 6/2007 | Ahrens | G02B 6/4246 385/92 |
| 8,761,558 | B2 | 6/2014 | Hirano et al. | |
| 9,018,533 | B2 * | 4/2015 | Kawaguchi | H05K 1/0218 174/254 |
| 9,054,812 | B2 | 6/2015 | Yagisawa et al. | |
| 9,316,799 | B2 * | 4/2016 | Shiraishi | G02B 6/42 |
| 2010/0102427 | A1 * | 4/2010 | Shin | H01L 23/24 257/686 |
| 2013/0108224 | A1 * | 5/2013 | Ishigami | G02B 6/4249 385/89 |
| 2014/0037254 | A1 * | 2/2014 | Wang | H04B 10/801 385/94 |
| 2014/0341513 | A1 * | 11/2014 | Lin | G02B 6/4272 385/89 |

FOREIGN PATENT DOCUMENTS

| | | |
|---|---|---|
| JP | 2011-128378 | 6/2011 |
| JP | 2012-181442 | 9/2012 |
| WO | 2013-046416 | 4/2013 |

* cited by examiner

*Primary Examiner* — Robert Tavlykaev
(74) *Attorney, Agent, or Firm* — IPUSA, PLLC

(57) ABSTRACT

An optical engine includes a substrate provided with terminals configured to connect to a connector provided on another substrate, a light receiver/emitter mounted on the substrate, and a cover covering the substrate. The light receiver/emitter is any one of a light receiver, a light emitter, and an element having functions of both the light receiver and the light emitter.

9 Claims, 20 Drawing Sheets

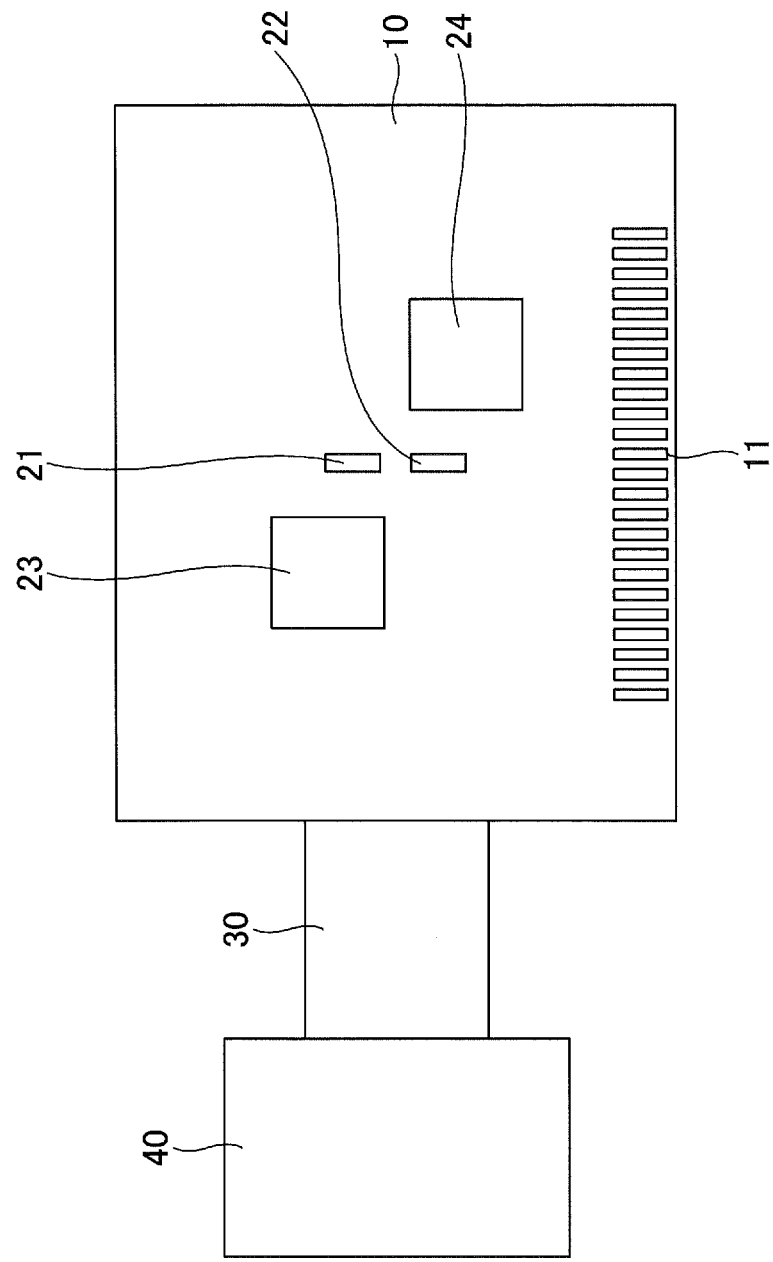

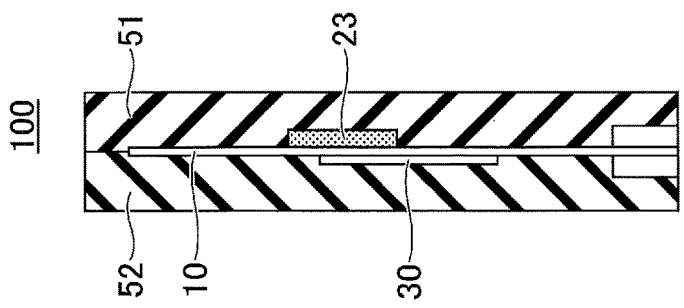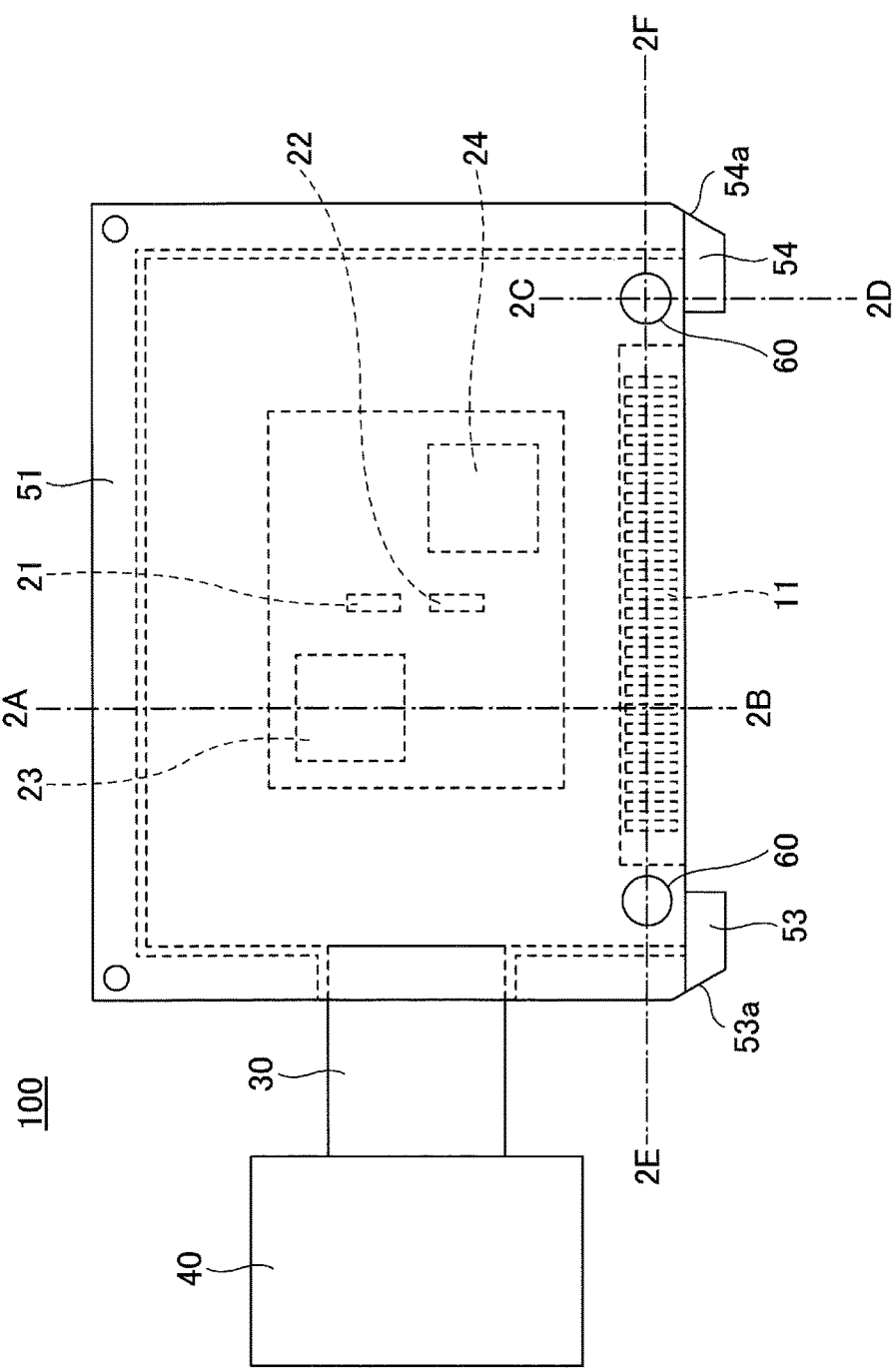

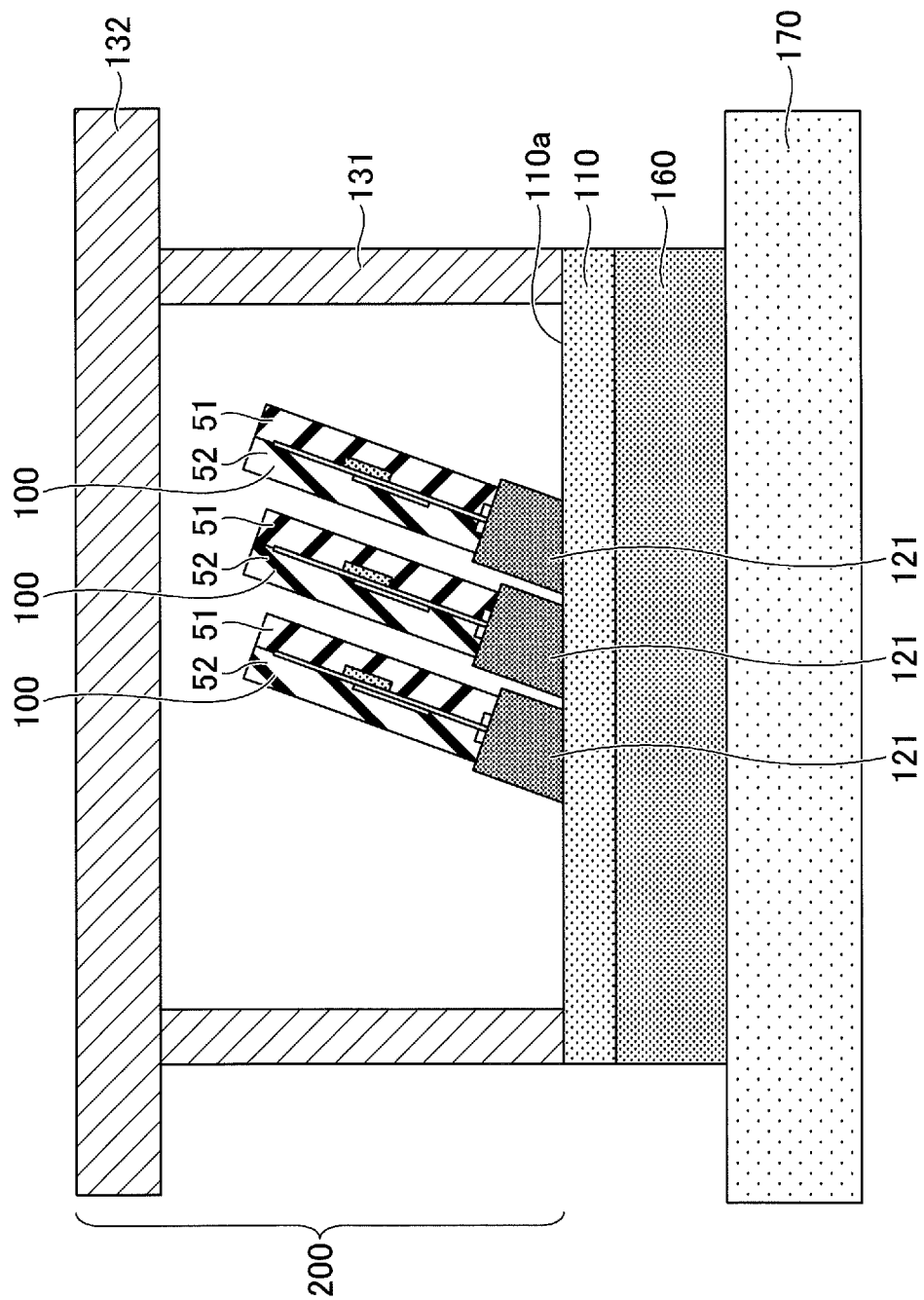

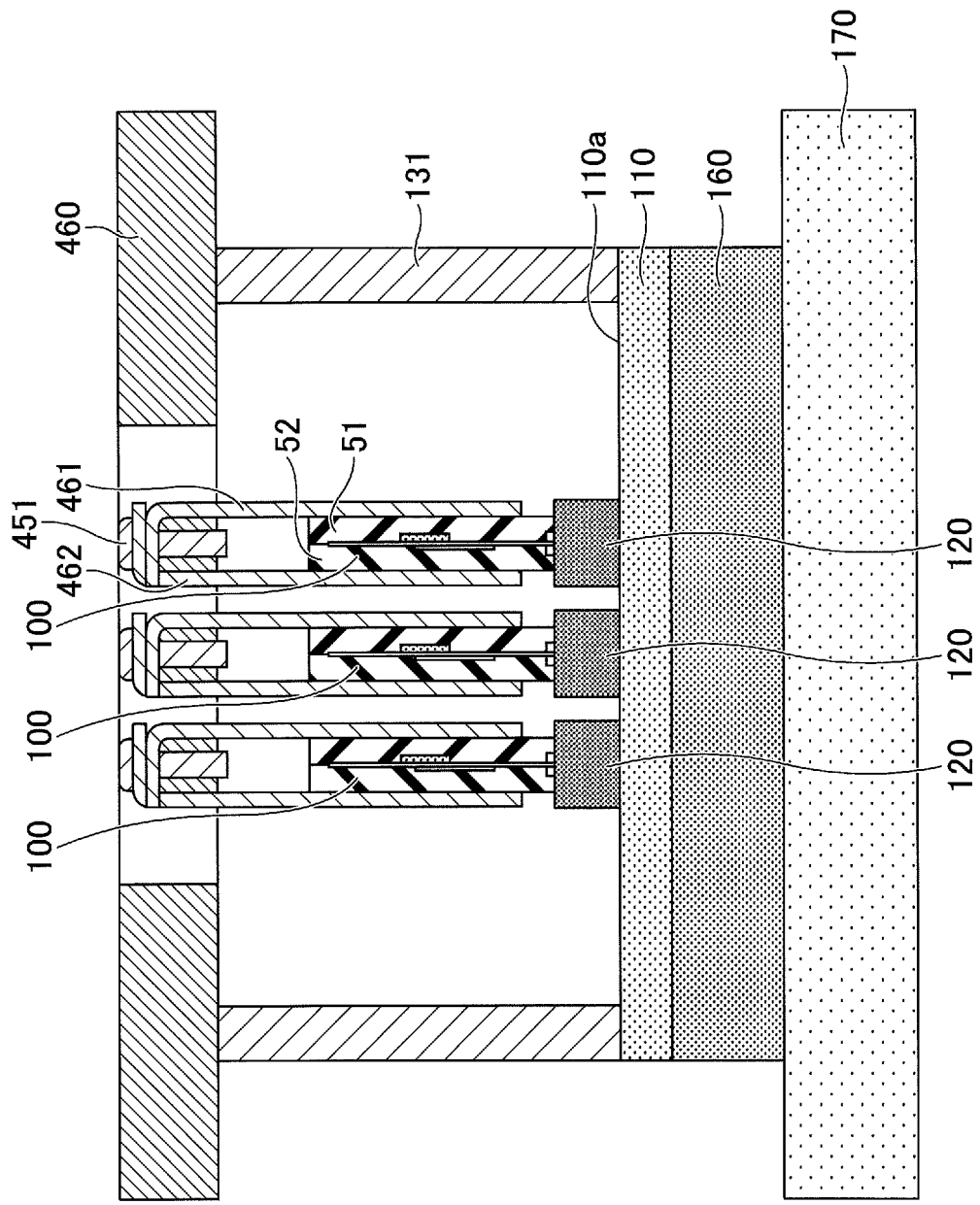

OPTICAL ENGINE AND OPTICAL MODULE

CROSS-REFERENCE TO RELATED APPLICATIONS

This application is based upon and claims priority to Japanese Patent Application No. 2017-211517 filed on Nov. 1, 2017, the entire contents of which are incorporated herein by reference.

BACKGROUND OF THE INVENTION

1. Field of the Invention

The embodiments discussed herein are related to an optical engine and an optical module.

2. Description of the Related Art

Supercomputers, high-end servers, or the like may employ high-speed interfaces that perform optical communication. The optical communication can cope with high-speed transmission of signals, and extend a transmission distance of the signals.

In a next-generation interface that performs the optical communication and has a relatively long transmission distance of several tens of meters, for example, an optical module is used to connect an optical cable and a sever, to perform a conversion between electrical signals and optical signals. The optical module converts the optical signals into the electrical signals, and converts the electrical signals into the optical signals.

The optical module is formed by an optical engine that includes a light emitter, a light receiver, a driver IC (Integrated Circuit) that drives the light emitter, and a TIA (Trans Impedance Amplifier) that converts a current into a voltage. The optical module may be provided on a mother board of an information processing apparatus, such as the supercomputer or the like. Examples of prior art may include Japanese Laid-Open Patent Publication No. 2011-128378, Japanese Laid-Open Patent Publication No. 2012-181442, and International Publication Pamphlet No. WO2013/046416.

When the optical module is provided on the mother board, multiple optical engines may be used. However, because the size of the mother board is limited, there are demands to mount the optical engine on the mother board at a high density and with a high reliability.

SUMMARY OF THE INVENTION

Accordingly, it is an object in one aspect of the embodiments to provide an optical engine and an optical module, which can mount the optical engine on a mother board of an information processing apparatus at a high density and with a high reliability.

According to one aspect of embodiments of the present invention, an optical engine includes a substrate provided with terminals configured to connect to a connector provided on another substrate, a light receiver/emitter mounted on the substrate, and a cover covering the substrate, wherein the light receiver/emitter is any one of a light receiver, a light emitter, and an element having functions of both the light receiver and the light emitter.

According to another aspect of the embodiments of the present invention, an optical module includes a first substrate provided with connectors, and an optical engine, the optical engine includes a second flexible substrate that is provided with terminals electrically connected to the one of the connectors, a light receiver/emitter mounted on the second substrate, and a cover covering the second substrate, wherein the light receiver/emitter is any one of a light receiver, a light emitter, and an element having functions of both the light receiver and the light emitter.

Other objects and further features of the present invention will be apparent from the following detailed description when read in conjunction with the accompanying drawings.

BRIEF DESCRIPTION OF THE DRAWINGS

FIG. 1 is a diagram illustrating an optical engine in one embodiment;

FIG. 2A and FIG. 2B are diagrams illustrating the optical engine in a first embodiment;

FIG. 7 is a diagram illustrating the optical module in the first embodiment;

FIG. 19 is a diagram illustrating another structure of the optical module in the fourth embodiment;

DESCRIPTION OF THE PREFERRED EMBODIMENTS

Figure 3:
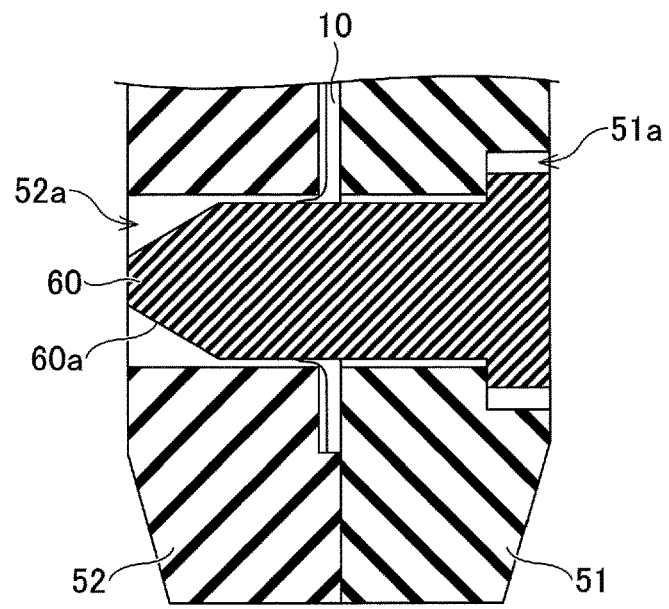
FIG. 3 is a diagram for explaining a method of connecting a cover of the optical engine in the first embodiment.

Embodiments of an optical engine and an optical module according to the present invention will be described, by referring to the drawings. In the drawings, those parts or members that are the same are designated by the same reference numerals, and a description of the same parts or members may be omitted.

First Embodiment

<Optical Engine>

An optical engine in a first embodiment will be described. FIG. 1 is a diagram illustrating the optical engine in one embodiment. As illustrated in FIG. 1, a light emitter 21, a light receiver 22, a driver IC 23, and a TIA 24 are provided on a first surface of a flexible substrate 10. The flexible substrate 10 may be a so-called FPC (Flexible Printed Circuit) having a structure in which insulator films made of polyimide or the like are laminated from above and below wirings. In addition, an optical waveguide 30 is connected to a second surface of the FPC 10, opposite to the first surface. For example, the first surface of the FPC 10 is a top surface, and the second surface of the FPC 10 is a bottom surface illustrated in FIG. 1. One end of the optical waveguide 30, opposite to the end connected to the FPC 10, is connected to an optical connector 40.

In this embodiment, the FPC 10 has a thickness greater than or equal to 50 μm and less than or equal to 150 μm. In this example, the FPC 10 has a thickness of 60 μm. Terminals 11 that connect to a FPC connector 120 or 121 that will be described later and is not illustrated in FIG. 1 are provided on a surface of the FPC 10.

The light emitter 21 may be a VCSEL (Vertical Cavity Surface Emitting Laser) or the like that converts an electrical signal into an optical signal and emit light. The light receiver 22 may be a photodiode or the like that converts an optical signal into an electrical signal and outputs the electrical signal.

In this specification, a "light receiver/emitter" refers to an element that has a function of at least one of receiving light or emitting light. Hence, the "light receiver/emitter" may be any one of a light receiver, a light emitter, and an element having functions of both the light receiver and the light emitter.

The optical waveguide 30 may be formed by a flexible sheet, and include a clad formed around a plurality of cores, such that light incident to the optical waveguide 30 propagates through the cores. The optical connector 40 includes a ferrule with a lens and a MT (Mechanical Transfer) ferrule that are connected and fixed to each other by a clip, for example.

In the optical engine, light incident to the optical connector 40 propagates through the cores within the optical waveguide 30, and reaches the light receiver 22 mounted on the FPC 10. An output current of the light receiver 22 changes according to the light received by the light receiver 22. The TIA 24 converts the output current of the light receiver 22 into a voltage, to convert the current change into a voltage change. An output of the TIA 24 may be used as an electrical signal inside the information processing apparatus. In addition, the electrical signal inside the information processing apparatus is converted into an optical signal by the light emitter 21. The light emitter 21 emits light towards the optical waveguide 30, and the light propagates through the cores of the optical waveguide 30 to output an optical signal from the optical connector 40.

An optical module in this embodiment uses multiple optical engines. Because the thickness of the FPC 10 is extremely thin compared to a general PCB (Printed Circuit Board), the optical engines can be mounted at a high density. However, as the FPC 10 is extremely thin, the FPC 10 may easily bend or warp. Consequently, in a case in which the optical engines are mounted at a high density, mutually adjacent optical engines may contact each other, or a conductance of the FPC 10 may change due to the bending or warping of the FPC 10, to affect the electrical signal.

For this reason, in this embodiment, a cover 51 and a cover 52 are provided to sandwich the FPC 10 from both sides, as illustrated in FIG. 2A and FIG. 2B. FIG. 2A is a plan view of the optical engine 100 covered by the cover 51 and the cover 52. FIG. 2B is a cross sectional view cut along a one-dot chain line 2A-2B in FIG. 2B. The cover 51 and the cover 52 are made of an insulator, such as a resin material or the like, and respectively have a thickness of approximately 1 mm. The optical waveguide 30 has a thickness of approximately 100 μm, and the driver IC 23 and the TIA 24 respectively have a thickness of approximately 250 μm. The first surface of the FPC 10, mounted with the driver IC 23 and the TIA 24, is entirely covered by the cover 51. The second surface of the FPC 10, to which the optical waveguide 30 is connected, is covered by the cover 52.

In this embodiment, the cover 51 and the cover 52 are fixed by a pin 60 as illustrated in FIG. 3. FIG. 3 is a cross sectional view cut along a one-dot chain line 2C-2D in FIG. 2A. The pin 60 is inserted from a hole 51a provided in the cover 51 towards a hole 52a provided in the cover 52. The hole 51a and the hole 52a respectively have a diameter of approximately 1 mm. The diameter of each of the hole 51a and 52a is slightly smaller than a diameter of the pin 60, so that the pin 60 is interfitted into the hole 51a and the hole 52a to fix the cover 51 and the cover 52 to each other. A tip end 60a of the pin 60 is tapered so that the tip end 60a easily enters the hole 51a and the hole 52a. In this embodiment, a the tip end 60a of the pin 60 penetrates the FPC 10 between the hole 51a and the hole 52a. As a result, the FPC 10, the cover 51, and the cover 52 are fixed together by the pin 60.

As described above, the terminals 11 are provided on the first surface of the FPC 10, to form pads of the FPC to be connected to the connector 120 or 121 that will be described later. The pin 60 is provided at positions illustrated in FIG. 2A, in order to fix the cover 51 and the cover 52 to the FPC 10 at both ends on the outer sides of the terminals 11, so as to prevent a positional error, or bending or warping of the FPC at these positions.

Figure 4:
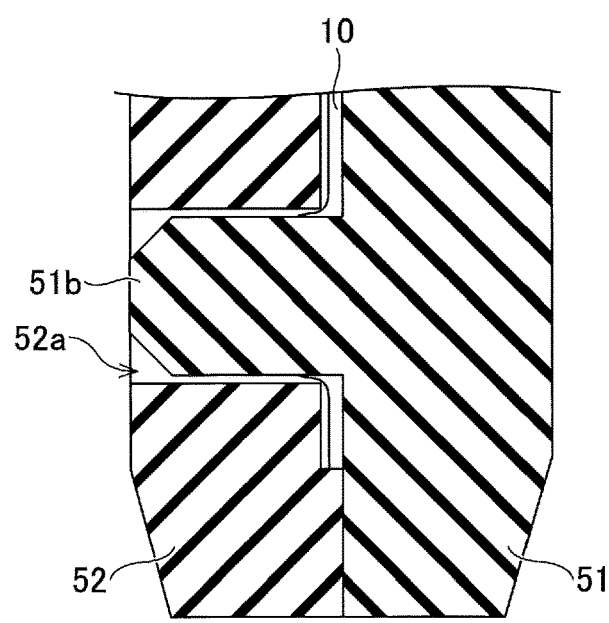
FIG. 4 is a diagram for explaining another method of connecting the cover of the optical engine in the first embodiment.

The optical module in this embodiment may be provided with projections on one of the two covers, corresponding to the openings in the other of the two covers. In an example illustrated in FIG. 4, a projection 51b corresponding to the opening 52a in the cover 52 is provided on the cover 51. In this case, the cover 51 and the cover 52 may be fixed to each other by interfitting the projection 51b into the opening 52a.

<Optical Module>

Figure 5:
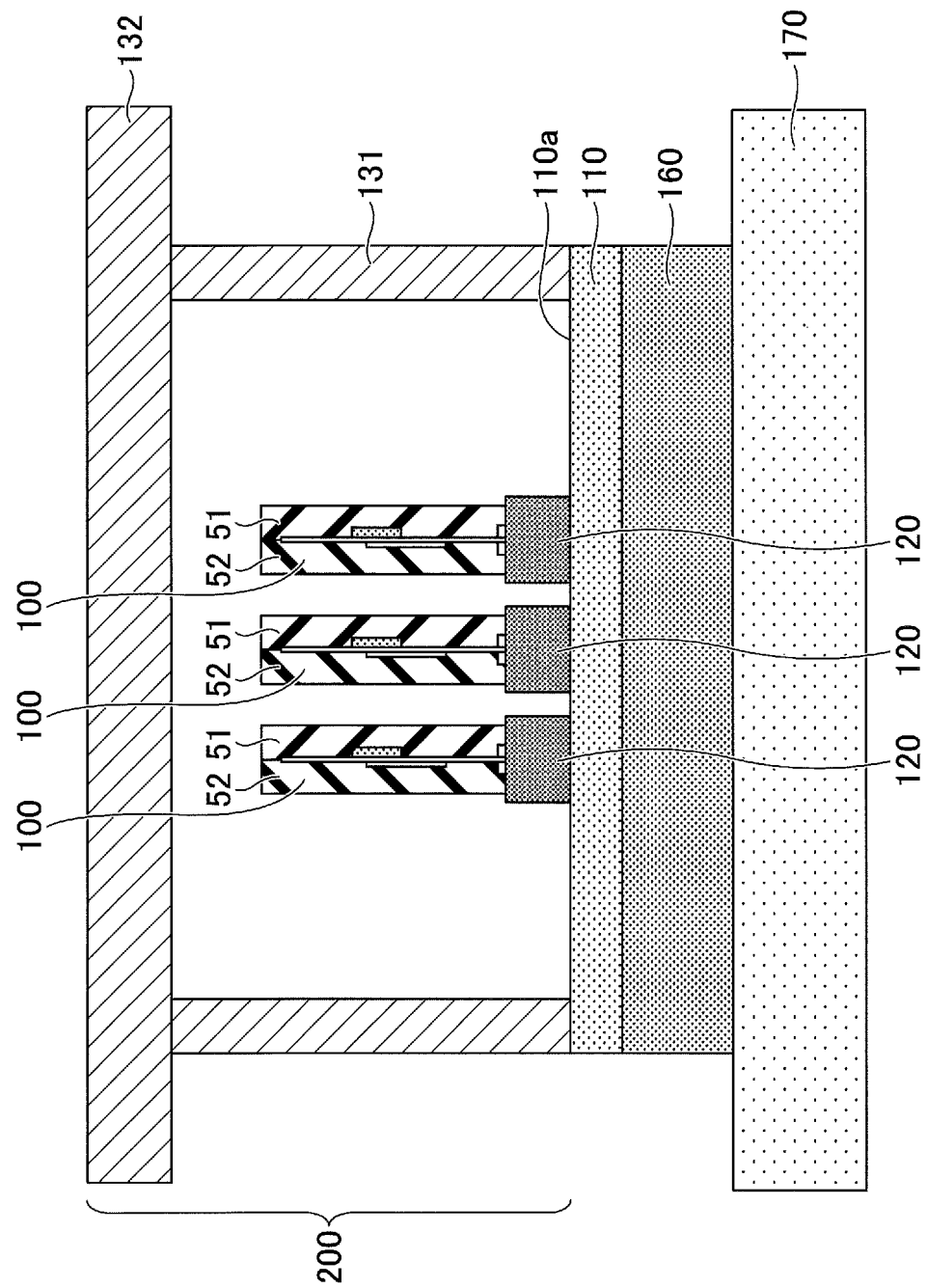
FIG. 5 is a diagram illustrating an optical module in the first embodiment.
Figure 6:
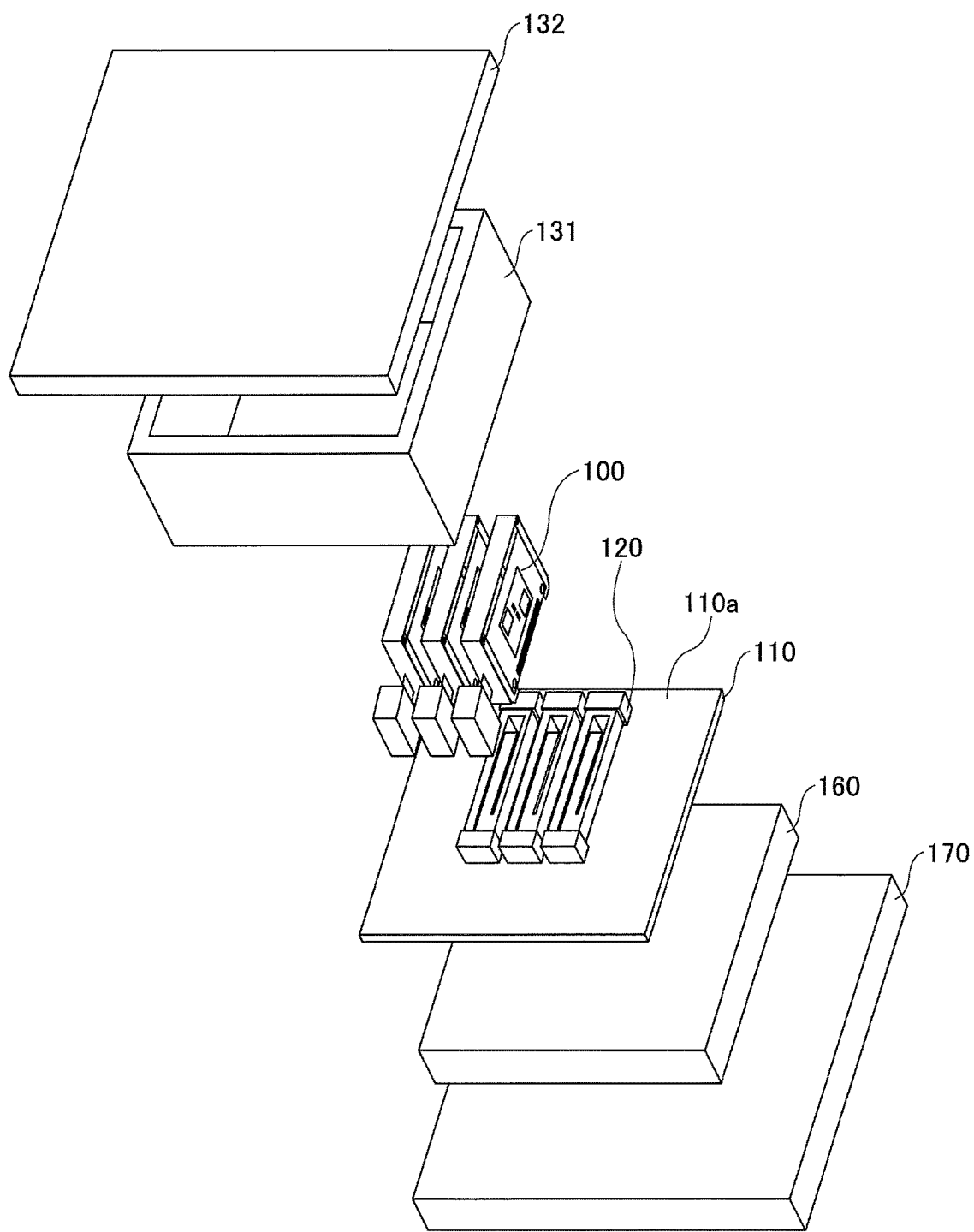
FIG. 6 is a disassembled perspective view of the optical module in the first embodiment.

Next, the optical module in this embodiment will be described, by referring to FIG. 5 and FIG. 6. FIG. 5 is a diagram illustrating the optical module in the first embodiment, and FIG. 6 is a disassembled perspective view of the optical module in the first embodiment.

An optical module 200 in this embodiment is mounted with multiple optical engines 100. The optical module 200 includes a wiring board 110, the FPC connector 120, and heat dissipation members 131 and 132. The wiring board 110 may be a PCB, and FPC connectors 120 may be arranged at predetermined intervals on a surface 110a of the wiring board 110. The optical engines 100 may be connected to the FPC connectors 120 by inserting the terminals 11 of each FPC 10 into a corresponding FPC connector 120. In the example illustrated in FIG. 5 and FIG. 6, in order to mount the optical engines 100 at the high density, the FPC connectors 120 are provided on the wiring board 110 so that the surface of the FPC 10 may be set approximately perpendicular to the surface 110a of the wiring board 110.

In the optical engine 100, the FPC 10 is sandwiched between the cover 51 and the cover 52 that are thicker than the FPC 10 and are uneasily bent or warped. For this reason, even when a force is applied to the optical engine 100 when mounting the optical engine 100 or after the optical engine 100 is mounted, the FPC 10 can be prevented from bending or warping.

The cover 51 and the cover 52 made of insulator cover the light emitter 21, the light receiver 22, the driver IC 23, and the TIA 24 that are provided in the optical engine 100. For this reason, even in a case in which the optical engines 100 are mounted at the high density in the optical module 200, it is possible to prevent terminals of the light emitter 21, the light receiver 22, the driver IC 23, and the TIA 24 that are provided in the mutually adjacent optical engines 100 from contacting each other.

In this embodiment, a rectangular tube-shaped heat dissipation member 131 is provided to surround peripheries of the optical engines 100 mounted on the FPC connectors 120. In addition, a plate-shaped heat dissipation member 132 is provided on the heat dissipation member 131 to cover the optical engines 100. The heat dissipation member 131 opposes a sidewall of each of the optical engines 100. On the other hand, the heat dissipation member 132 opposes a top surface of each of the optical engines 100.

The optical module 200 described above is connected to a wiring board 170 that forms a mother board, via a socket 160 that converts a pitch of the terminals.

The optical module 200 may include the optical engines 100 that are arranged obliquely with respect to the surface 110*a* of the wiring board 110, as illustrated in FIG. 7. In this case, the FPC connectors 121 are mounted obliquely with respect to the surface 110*a*, so as to mount the optical engines 100 obliquely with respect to the surface 110*a*. When the optical engine 100 is mounted obliquely with respect to the surface 110*a*, it becomes easier to connect and disconnect the optical engine 100 with respect to the FPC connector 121. In addition, an overall height of the optical module 200 can be reduced.

<Connection of Optical Engine>

Next, a description will be given of the connection of the optical engine 100 to the FPC connector 120.

Figure 8A:
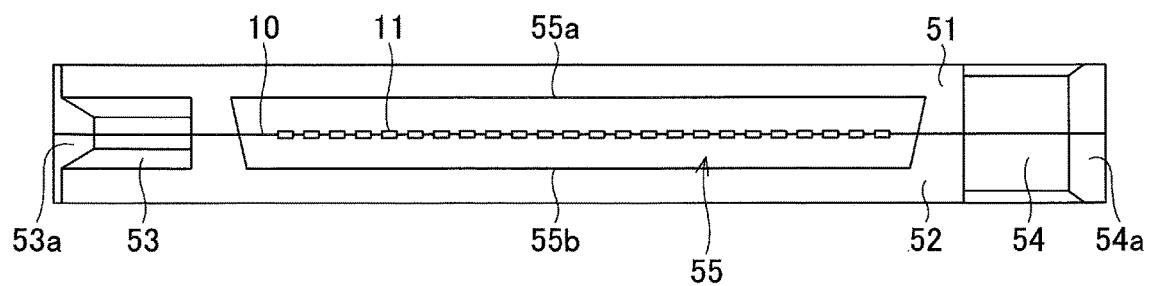
FIG. 8A and FIG. 8B are diagrams for explaining the optical module in the first embodiment.
Figure 8B:
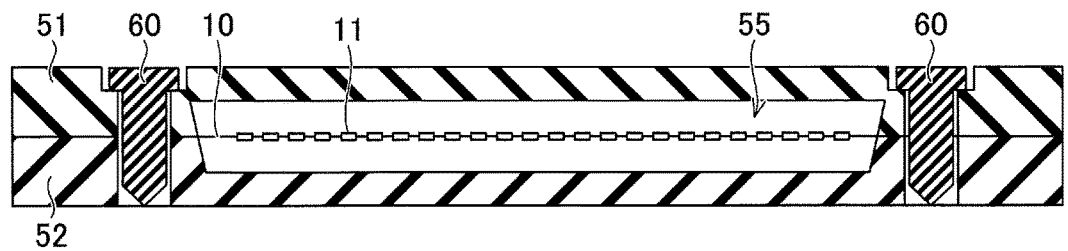
Figure 9:
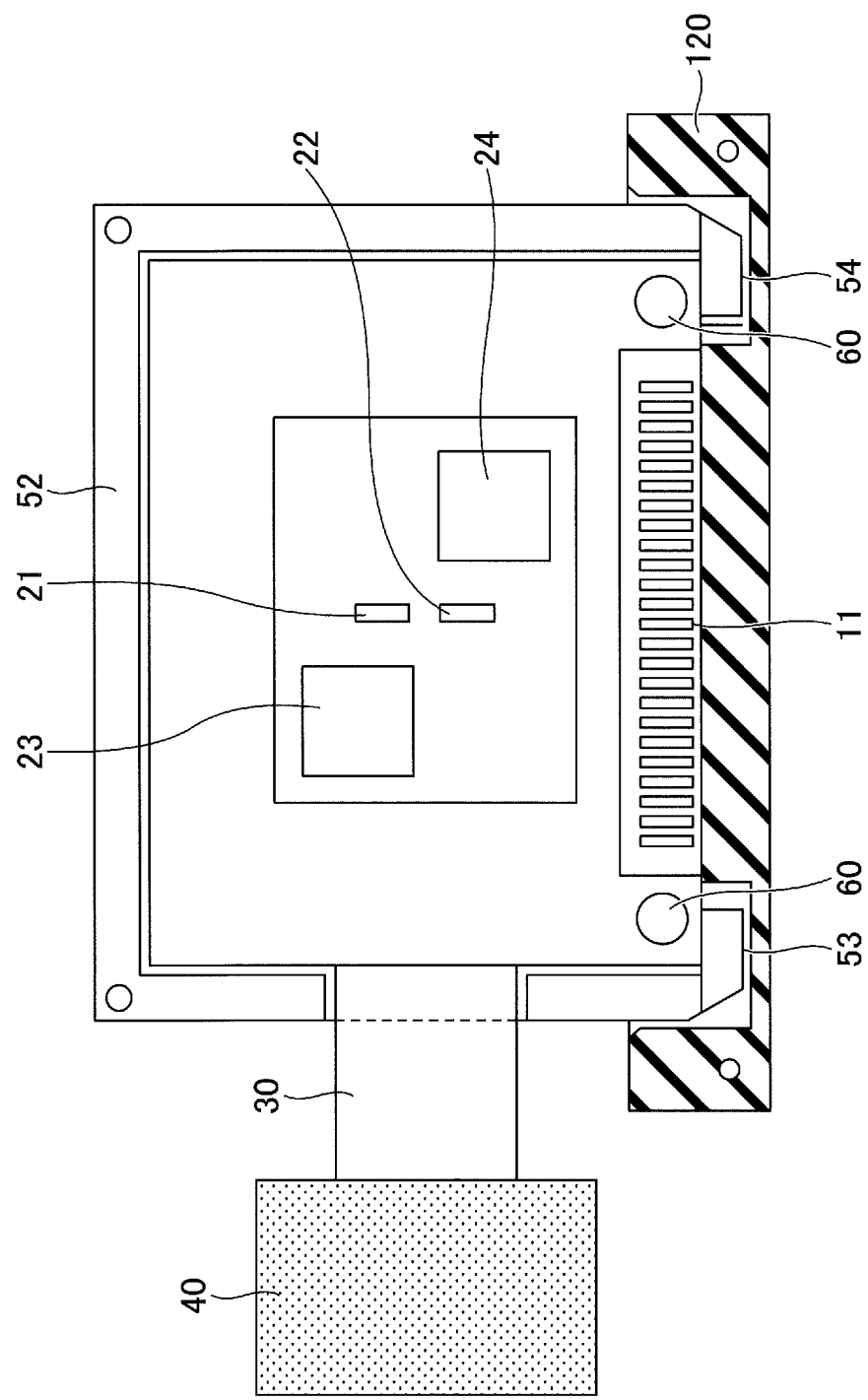
FIG. 9 is a diagram for explaining the optical module connected to a PFC connector.

FIG. 8A is a bottom view of the optical engine 100, and FIG. 8B is a cross sectional view cut along a one-dot chain line 2E-2F in FIG. 2A. FIG. 9 is a diagram illustrating the optical engine 100 connected to the FPC connector 120, in a state in which the cover 51 is removed and the FPC connector 120 is cut along a plane parallel to the FPC 10.

In this embodiment, a first protrusion 53 and a second protrusion 54 that extend from the flexible substrate 10 towards the FPC connector 120 are provided on the cover 51 and the cover 52. Corresponding parts of the covers 51 and 52 form the first protrusion, and corresponding parts of the covers 51 and 52 form the second protrusion 54. As illustrated in FIG. 9, the first protrusion 53 and the second protrusion 54 respectively fit into a first cavity and a second cavity famed in the FPC connector 120. The first protrusion 53 and the second protrusion 54 are formed in the state in which the cover 51 and the cover 52 are connected to each other, and in this state, the terminals 11 are positioned between the first protrusion 53 and the second protrusion 54.

As illustrated in FIG. 8A, the first protrusion 53 is provided on the left side of the terminals 11, and the second protrusion 54 is provided on the right side of the terminals 11. The first protrusion 53 and the second protrusion 54 have mutually different shapes, and the second protrusion 54 is thicker than the first protrusion 53. The first cavity provided in the FPC connector 120 has a shape corresponding to the shape of the first protrusion 53, and the second cavity provided in the FPC connector 120 has a shape corresponding to the shape of the second protrusion 54. By forming the first protrusion 53 and the second protrusion 54 to mutually different shapes, it is possible to prevent the optical engine 100 from being erroneously inserted into the FPC connector 120 in an incorrect direction or facing an incorrect direction.

In addition, the first protrusion 53 includes a tapered part 53*a* that is tapered inward toward the FPC connector 120, and the second protrusion 54 includes a tapered part 54*a* that is tapered inward toward the FPC connector 120. The tapered part 53*a* and the tapered part 54*a* facilitate insertion of the optical engine 100 into the FPC connector 120.

As illustrated in FIG. 8A and FIG. 8B, an opening 55 is formed at parts of the cover 51 and the cover 52 where the terminals 11 are provided. The FPC connector 120 enters the opening 55 to connect the terminals 11 to the FPC connector 120 as illustrated in FIG. 9.

In addition, as illustrated in FIG. 8A and FIG. 8B, the opening 55 has an inverted trapezoidal shape. A side 55*a* of the opening 55 at the cover 51 is longer than a side 55*b* of the opening 55 at the cover 52. The FPC connector 120 has a shape corresponding to the shape of the opening 55. Because the opening has the inverted trapezoidal shape, it is possible to prevent the optical engine 100 from being erroneously inserted into the FPC connector 120 in an incorrect direction. Hence, a combination of the shapes of the first and second protrusions 53 and 54 and the first and second cavities, and a combination of the shapes of the opening 55 and the FPC connector 120, provide a double prevention mechanism for preventing the optical engine 100 from being erroneously inserted into the FPC connector 120 in the incorrect direction or facing the incorrect direction.

Second Embodiment

Next, a second embodiment will be described. In this embodiment, flanges are provided on the covers of the optical engine, and hooks for fixing the flanges are provided on the FPC connector.

Figure 10:
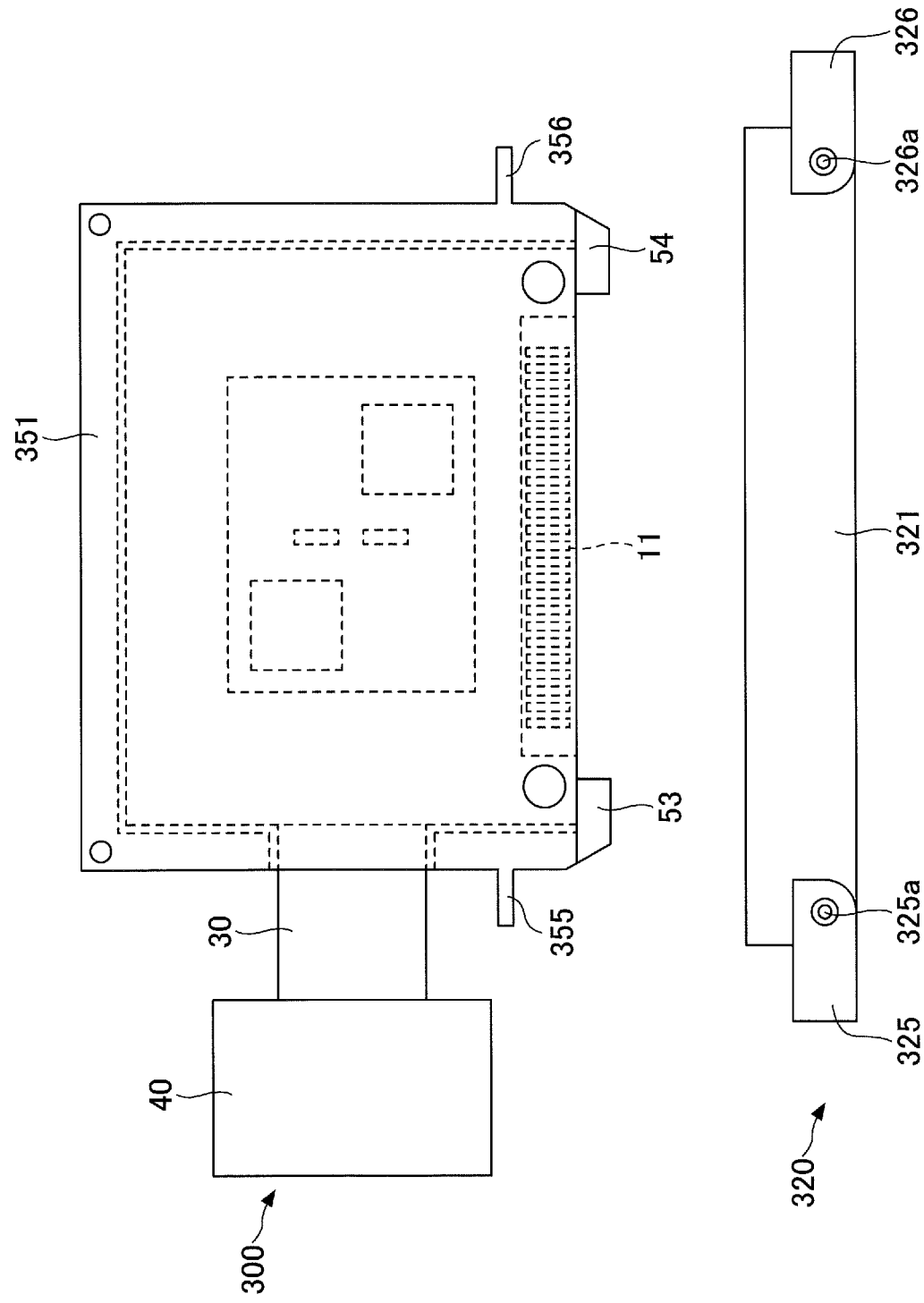
FIG. 10 is a diagram for explaining the optical module in a second embodiment.

A description will be given of the optical engine and the FPC connector in this embodiment, by referring to FIG. 10. An optical engine 300 in this embodiment includes a cover 351 and the other cover (not illustrated) that are mounted on both sides of the FPC 10. Although only the cover 351 is illustrated in FIG. 10 at the paper top surface end, the other cover is provided at the paper bottom surface end. The FPC 10 is sandwiched and fixed between the cover 351 and the other cover.

A first flange 355 and a second flange 356 that extend from the FPC 10 in a direction perpendicular to a direction in which the optical engine 300 is inserted into a FPC connector 320 are provided on the cover 351 and the other cover. Corresponding parts of the cover 351 and the other cover form the first flange 355, and corresponding parts of the cover 351 and the other cover form the second flange 356.

The FPC connector 320 includes a main body 321, a first hook 325 corresponding to the first flange 355, and a second hook 326 corresponding to the second flange 356. The first hook 325 is mounted on the main body 321 in a state rotatable about a rotational shaft 325*a* as its center of rotation, and the second hook 326 is mounted on the main body 321 in a state rotatable about a rotational shaft 326*a* as its center of rotation.

Figure 11:
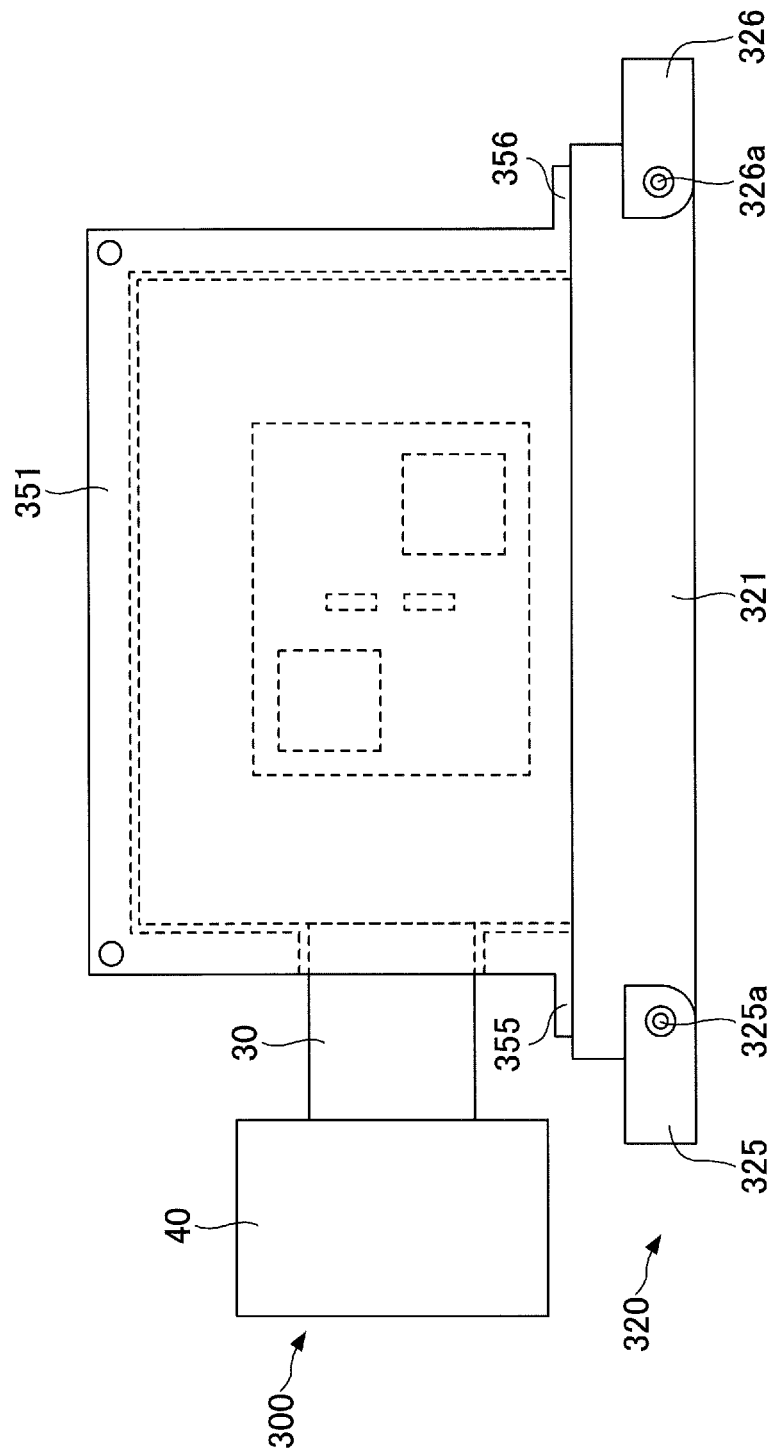
FIG. 11 is a diagram for explaining the optical module in the second embodiment.

When mounting the optical engine 300 on the FPC connector 320, the side of the optical engine 300 provided with the terminals 11 is inserted into the FPC connector 320, from the state illustrated in FIG. 10 to the state illustrated in FIG. 11. Hence, the first flange 355 and the second flange 356 contact an upper part of the main body 321.

Figure 12:
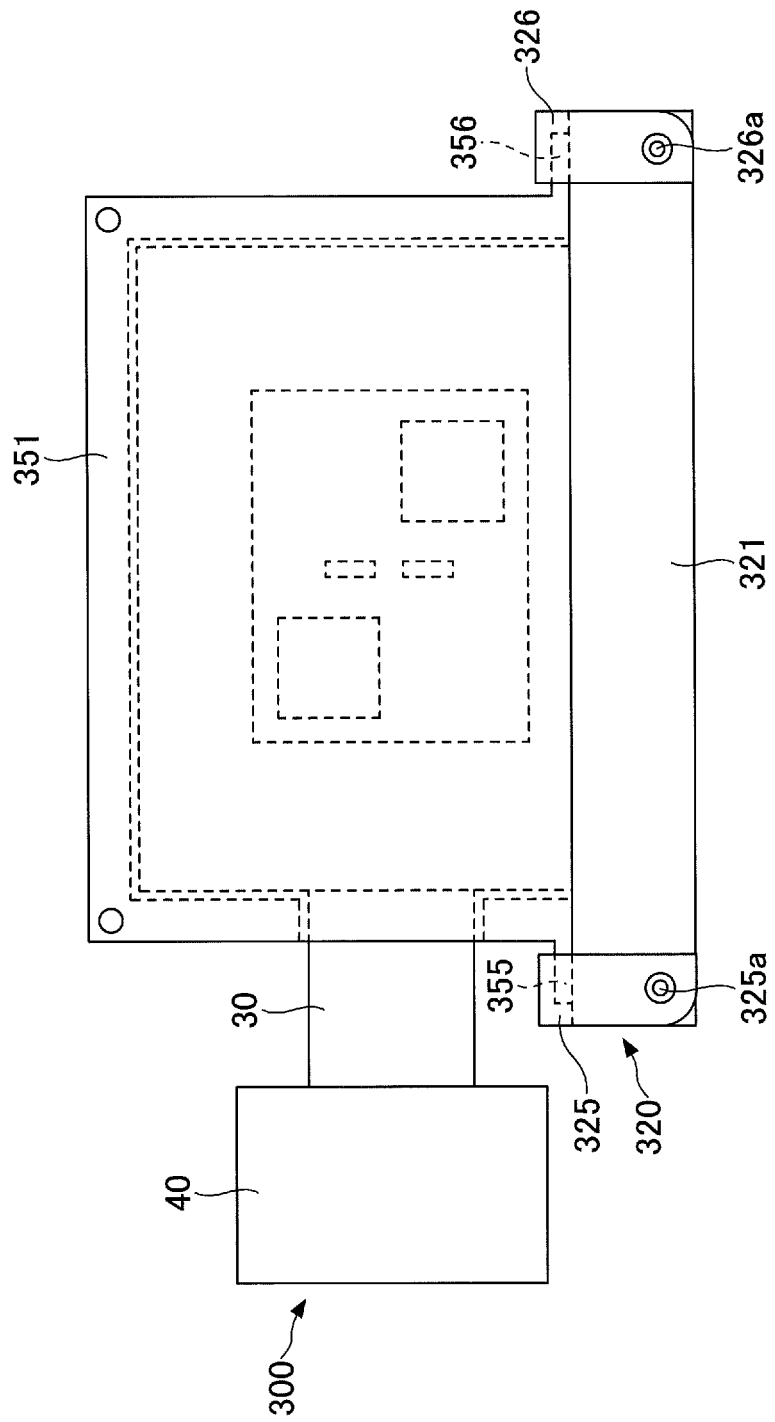
FIG. 12 is a diagram for explaining the optical module in the second embodiment.

Thereafter, as illustrated in FIG. 12, the first hook 325 is rotated clockwise by approximately 90° about the rotational shaft 325a, to cover and fix the first flange 355 by the first hook 325. Similarly, the second hook 326 is rotated counterclockwise by approximately 90° about the rotational shaft 326a, to cover and fix the second flange 356 by the second hook 326. Because the first and second flanges 355 and 366 are respectively fixed by the first and second hooks 325 and 326, it is possible to prevent the optical engine 300 from slipping off from the FPC connector 320.

The features and effects of the second embodiment are otherwise similar to the features and effects of the first embodiment described above.

Third Embodiment

Next, a third embodiment will be described. In an optical module in this embodiment, a resin material fills the inside of the region surrounded by the wiring board 110, the FPC connectors 120, and the heat dissipation members 131 and 132. A manufacturing process of the optical module in this embodiment will be described, by referring to FIG. 13, FIG. 14, and FIG. 15.

Figure 13:
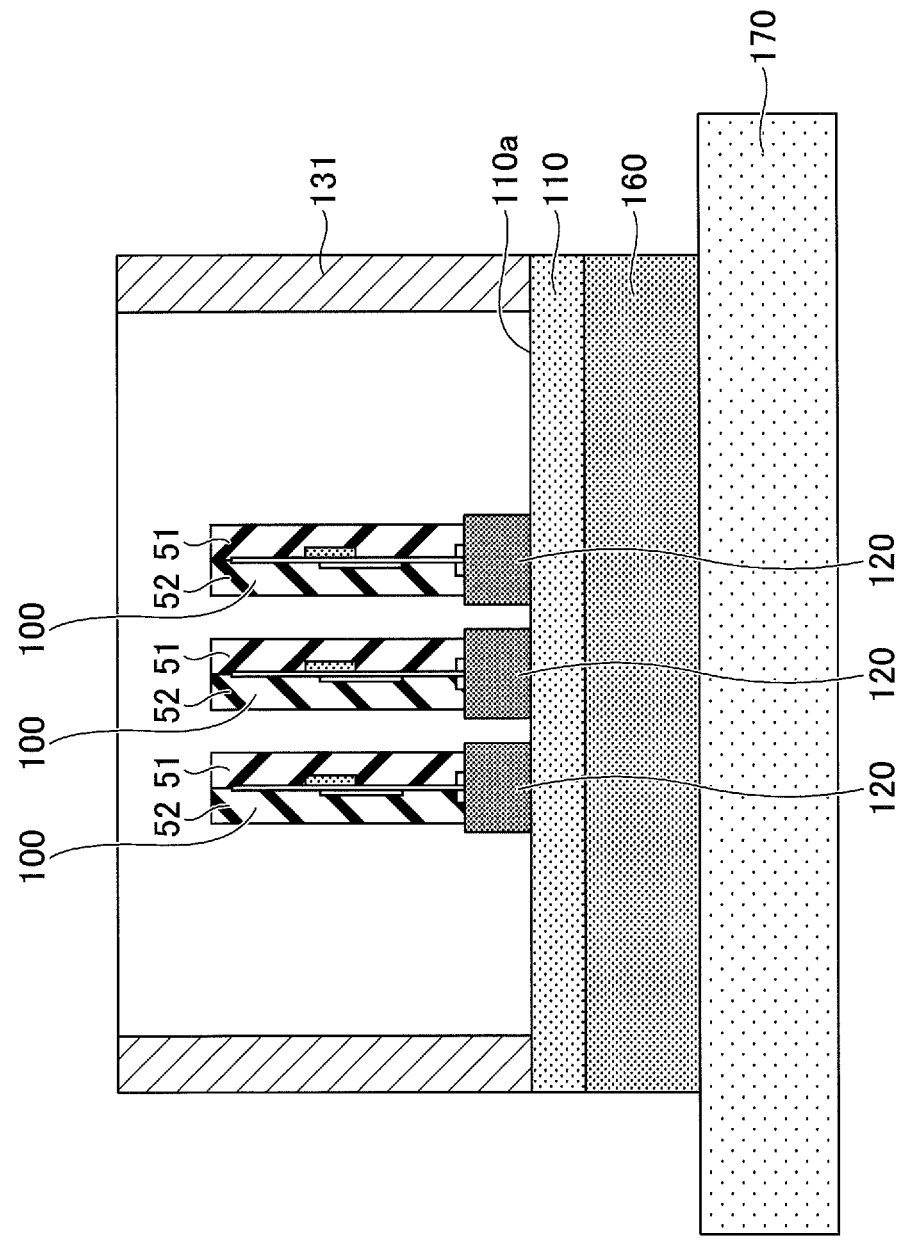
FIG. 13 is a diagram for explaining a manufacturing process of the optical module in a third embodiment.

First, as illustrated in FIG. 13, the optical engine 100 is connected to each FPC connector 120, and the heat dissipation member 131 is provided to cover the optical engines 100 mounted on the FPC connectors 120.

Figure 14:
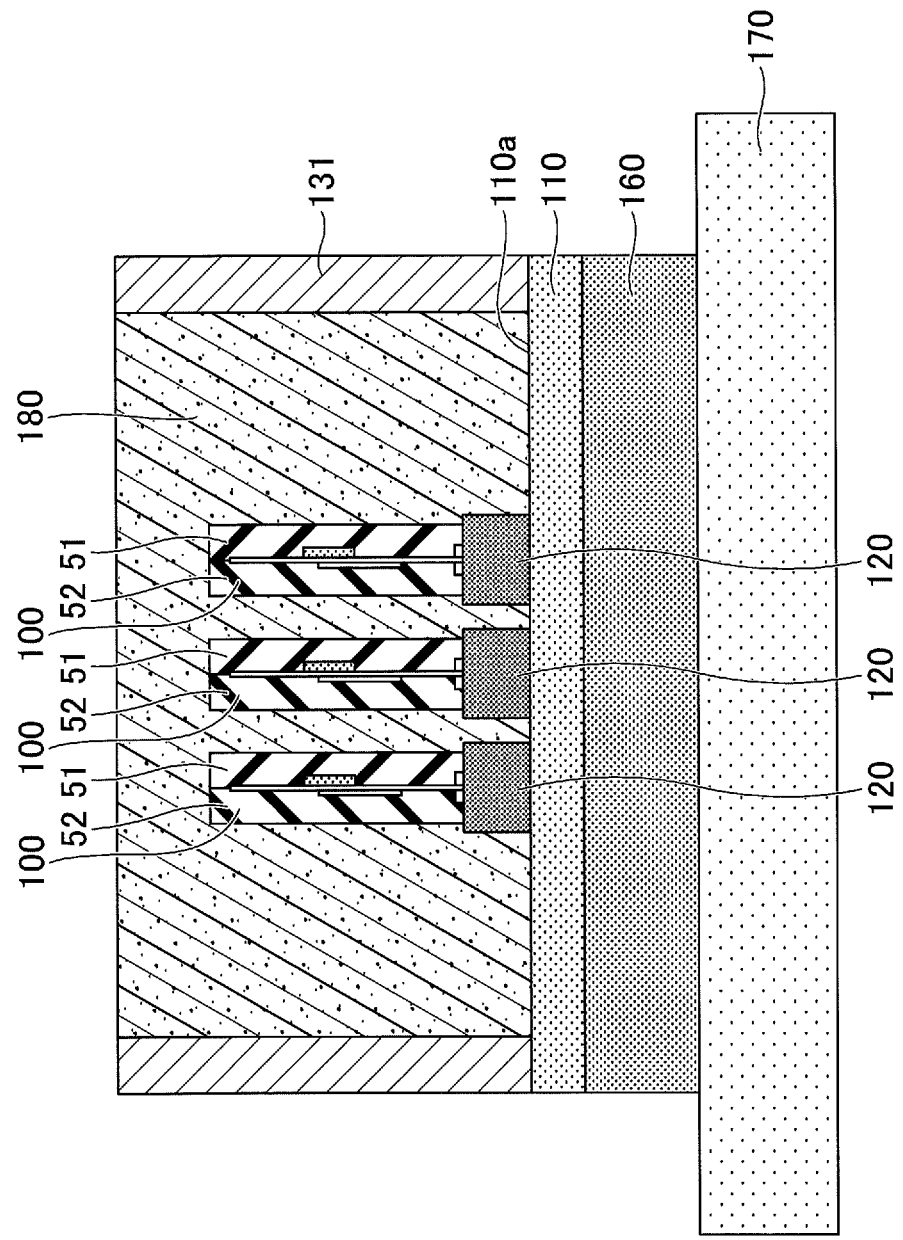
FIG. 14 is a diagram for explaining the manufacturing process of the optical module in the third embodiment.

Next, as illustrated in FIG. 14, a resin material 180 is filled into an inner side of the heat dissipation member 131 and cured. Hence, each of the optical engines 100 is fixed. The resin material 180 may be a silicon resin or the like, for example. In this embodiment, as the cover 51 and the cover 52 are mounted on the optical engine 100, the optical engine 100 will not bent or warped by the resin material 180 that flows into the inner side of the heat dissipation member 131.

If the covers 51 and 52 were not provided on the optical engine 100, the flexible substrate may be pushed and bent by the flow of the resin material 180 entering the inner side of the heat dissipation member 131 as the flexible substrate is extremely thin, and may cause inconveniences such as a change in the conductivity of the wirings of the flexible substrate, or contact between the mutually adjacent optical engines 100. However, according to this embodiment, the optical engine 100 is provided with the cover 51 and the cover 52, and the optical engine 100 will not be bent by the flow of the resin material 180, and the above described inconveniences will not occur.

Figure 15:
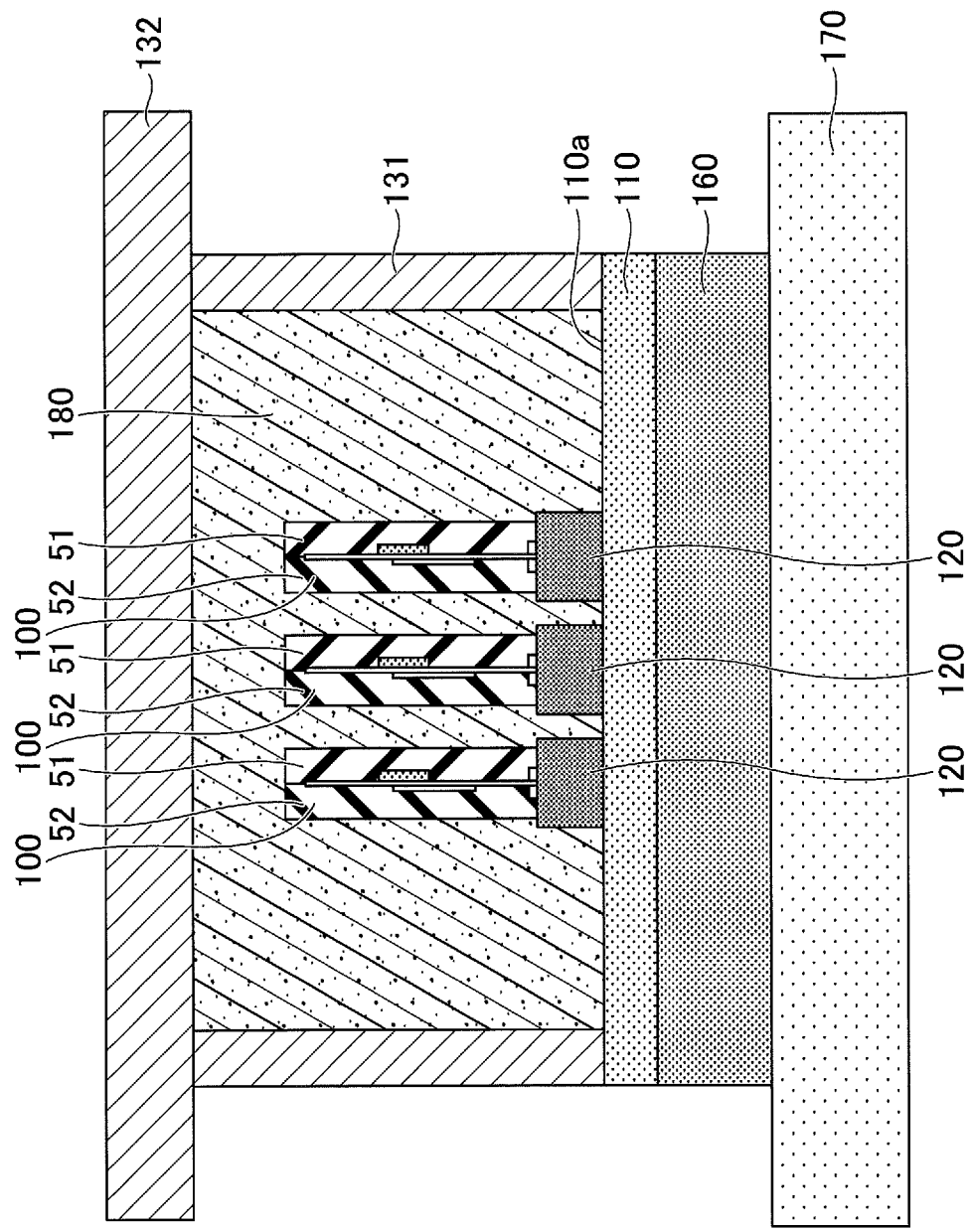
FIG. 15 is a diagram for explaining the manufacturing process of the optical module in the third embodiment.

Next, as illustrated in FIG. 15, the plate-shaped heat dissipation member 132 is mounted on the cured resin material 180. An upper surface of the heat dissipation member 131 and the heat dissipation member 132 are bounded by an adhesive agent or the like.

The optical module in this embodiment includes the resin material 180 that fills the peripheries of the optical engines 100 that are connected to the FPC connectors 120, to prevent the optical engine 100 from slipping off the FPC connector 120, and prevent the optical engine 100 from moving.

In this embodiment, the resin material 180 is preferably an insulator, and from a heat dissipation viewpoint, is more preferably a resin material having a high thermal conductivity.

Fourth Embodiment

Next, the optical module in a fourth embodiment will be described. The optical module in this embodiment has a structure having improved heat dissipation. When the optical engine 100 is driven, elements such as the driver IC 23 and the TIA 24 generate heat, and efficient dissipation of such heat is desirable.

Figure 16:
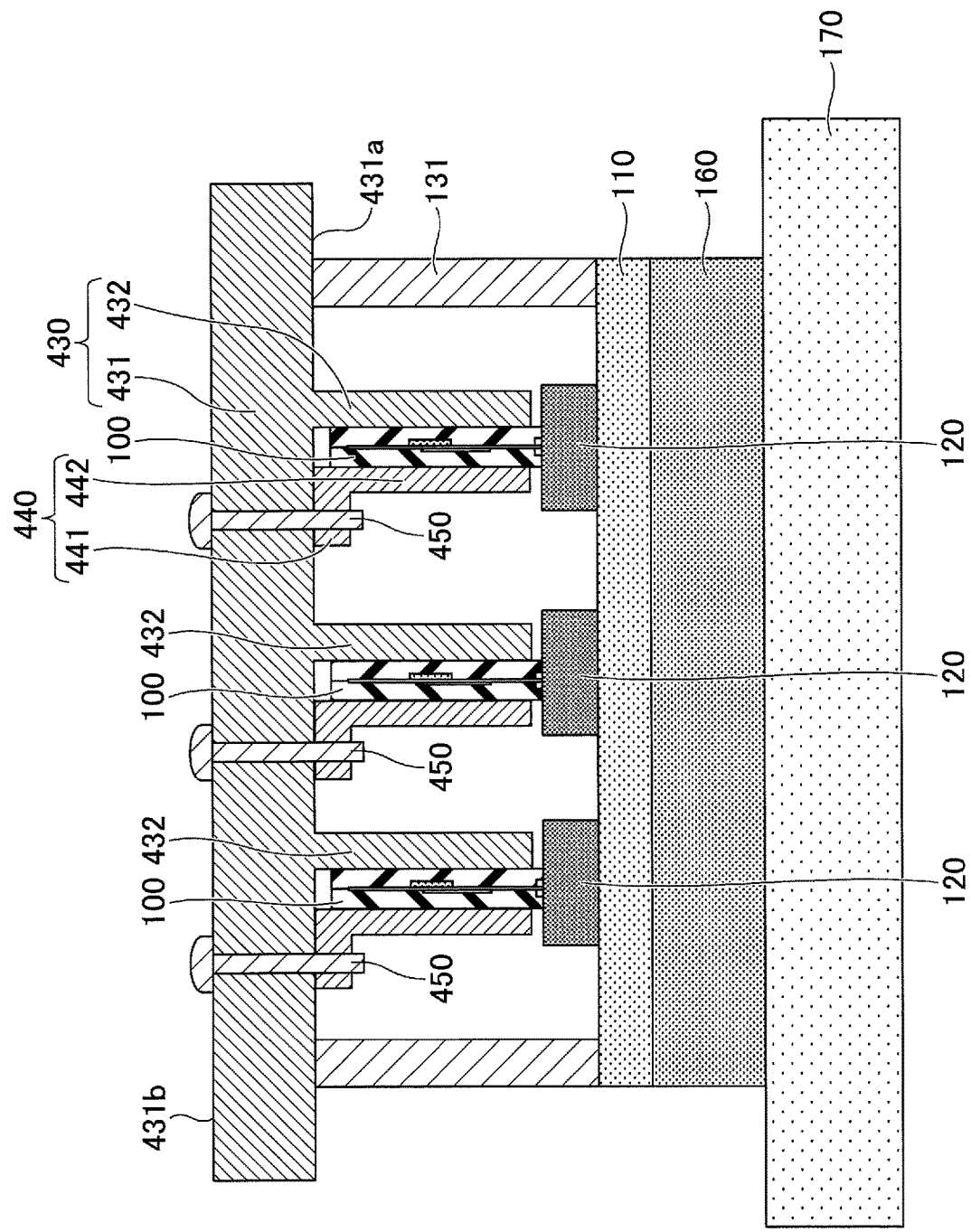
FIG. 16 is a diagram illustrating a structure of the optical module in a fourth embodiment.

As illustrated in FIG. 16, the optical module in this embodiment including a heat dissipation member 430 and a heat dissipation member 440, in order to efficiently dissipate the heat generated from the driver IC 23 and the TIA 24 that are provided on each of the optical engines 100. The heat dissipation member 430 and the heat dissipation member 440 are made of a material having a high thermal conductivity, such as metal, aluminum or the like, for example. However, the heat dissipation member 430 and the heat dissipation member 440 may be made of a resin or the like as long as a sufficient heat dissipation effect is obtainable by the material used.

The heat dissipation member 430 includes an upper plate 431 corresponding to the heat dissipation member 132, and heat dissipation plates 432 extending from a surface 431a of the upper plate 431 in a direction in which the optical engine 100 connects to the FPC connector 120. The heat dissipation member 440 has an L-shape, and includes a connection part 441 mounted on the surface 431a, and a heat dissipation plate 442 connected approximately perpendicularly to the connection part 441. In this embodiment, the connection part 441 is mounted on the surface 431a by a screw 450.

In this embodiment, the optical engine 100 mounted with the cover 51 and the cover 52 is sandwiched between the heat dissipation plate 432 and the heat dissipation plate 442. The heat generated from elements of the optical engine 100 such as the driver IC 23 and the TIA 24 is transferred to the heat dissipation plates 432 and 442 via the cover 51 and the cover 52, respectively, and is further transferred to the upper plate 431, to be released from a surface 431b.

Figure 17A:
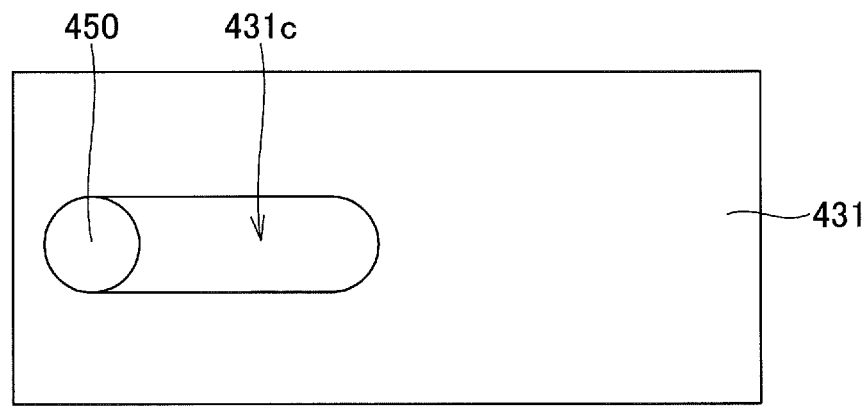
FIG. 17A and FIG. 17B are diagrams for explaining the optical module in the fourth embodiment.
Figure 17B:
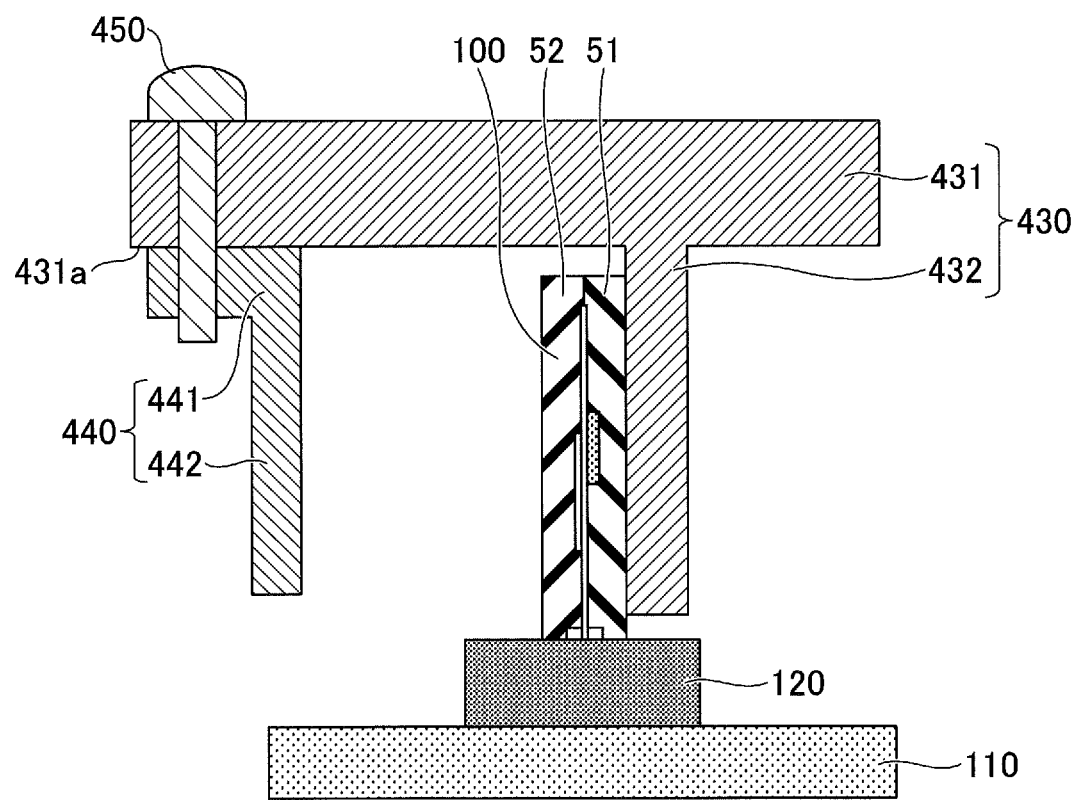

Next, a method of mounting the heat dissipation members 430 and 440 in the optical module will be described, by referring to FIG. 17A through FIG. 18B. In this embodiment, after the optical engine 100 is mounted on each FPC connector 120, the heat dissipation member 430 is arranged to cover the optical engines 100 and the FPC connectors 120, to make the cover 51 contact the heat dissipation plate 432 as illustrated in FIG. 17B. FIG. 17A is a top view in this state, and FIG. 17B is an internal side view in this state.

An elongated hole 431c for mounting the heat dissipation member 440 is provided in the upper plate 431, and the heat dissipation member 440 is mounted on the surface 431a by the screw 450 that is inserted through the elongated hole 431c. The heat dissipation member 440 mounted on the surface 431a by the screw 450 is movable in the right and left directions in FIG. 17A and FIG. 17B.

Figure 18A:
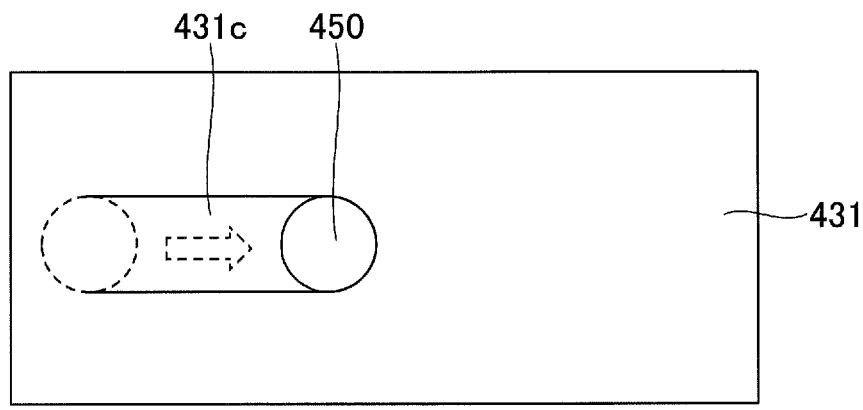
FIG. 18A and FIG. 18B are diagrams for explaining the optical module in the fourth embodiment.
Figure 18B:
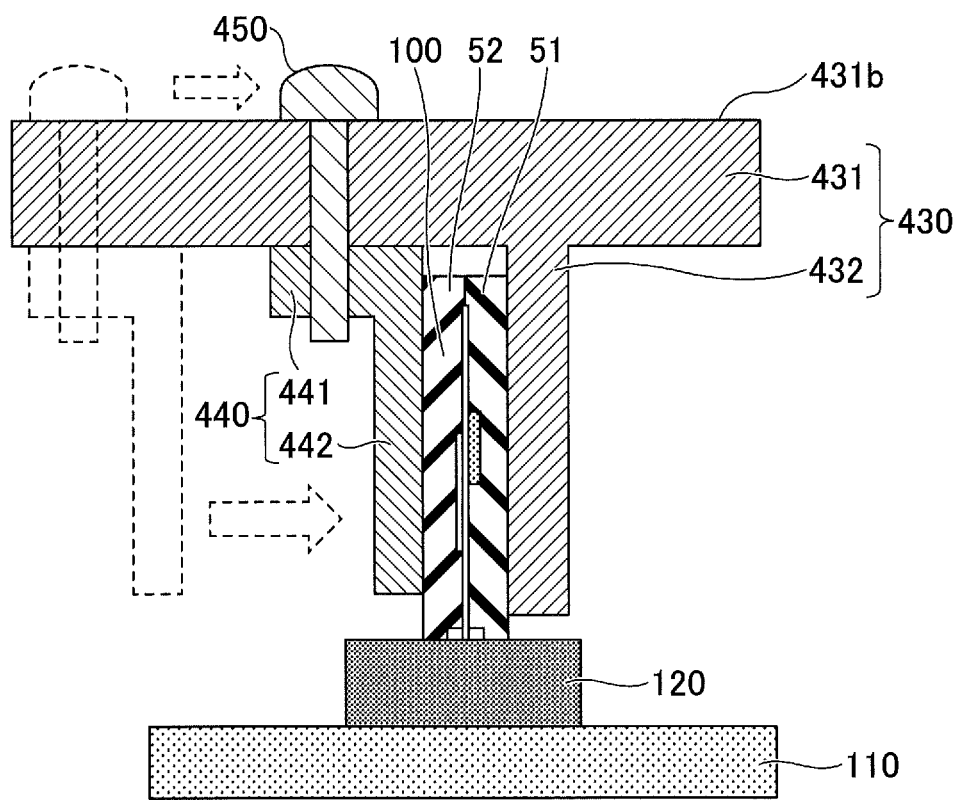

Thereafter, the heat dissipation member 440 is moved in the right direction as illustrated in FIG. 18A and FIG. 18B, to make the cover 52 contact the heat dissipation plate 442, and the screw 450 is fastened at this position to fix the heat dissipation member 440. Hence, the optical engine 100 is fixed in the state sandwiched between the heat dissipation plate 432 and the heat dissipation plate 442, and the heat generated from the driver IC 23 or the TIA 24 can be efficiently dissipated from the heat dissipation plates 432 and 442 that are in contact with the covers 51 and 52, respectively.

For example, the heat is not smoothly dissipated when gaps are formed between the optical engine 100 and the heat dissipation plate 432 and the heat dissipation plate 442. However, in this embodiment, the heat dissipation member 440 can be moved with respect to the heat dissipation member 430, so that the cover 51 and the heat dissipation plate 432 more positively make contact and the cover 52 and the heat dissipation plate 442 more positively make contact. As a result, it is possible to efficiently dissipate the heat generated from the driver IC 23, the TIA 24, or the like.

Figure 20:
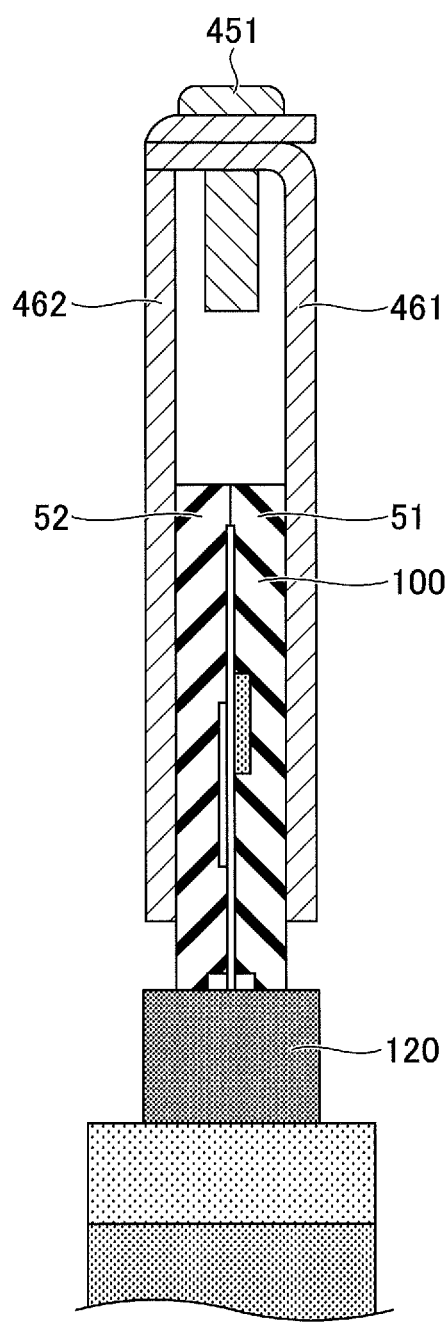
FIG. 20 is an enlarged view of the other structure of the optical module in the fourth embodiment.
Figure 21:
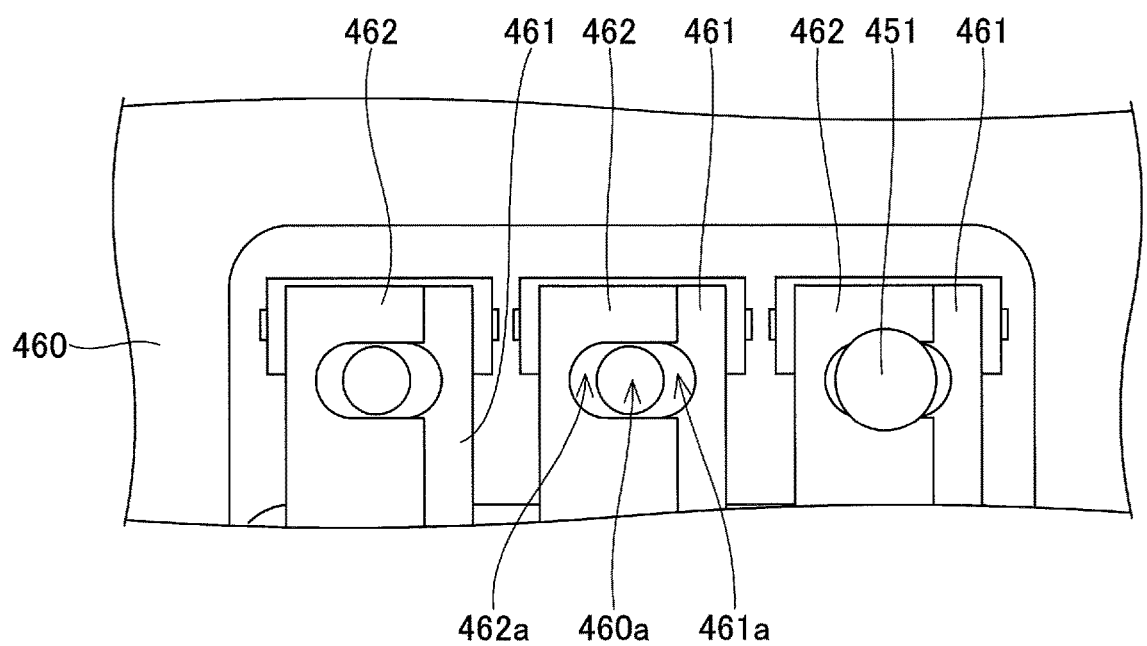
FIG. 21 is a top view of the other structure of the optical module in the fourth embodiment.

The optical module in this embodiment may have a heat dissipation plate 461 and a heat dissipation plate 462 that are mounted on a heat dissipation member 460 by a screw 451 as illustrated in FIG. 19 through FIG. 21, so that both the heat dissipation plate 461 and the heat dissipation plate 462 are movable. FIG. 19 is a cross sectional view, FIG. 20 is an enlarged view, and FIG. 21 is a top view of the optical module. FIG. 21 illustrates a state in which the heat dissipation plates 461 and 462 on the right side of this figure are fasted by the screw 451.

As illustrated in FIG. 21, a screw hole 460a is formed in the heat dissipation member 460. In addition, as illustrated in FIG. 20, upper parts of the heat dissipation plates 461 and 462 are bent to an L-shape. An elongated opening 461a corresponding to the screw hole 460a is provided in the bent upper part of the heat dissipation plate 461. Similarly, an elongated opening 462a corresponding to the screw hole 460a is provided in the bent upper part of the heat dissipation plate 462. When fastening the heat dissipation plates 461 and 462 on the heat dissipation member 460, the heat dissipation plates 461 and 462 may be moved in the horizontal direction along the respective openings 461a and 462a.

In this embodiment, the heat dissipation plate 461 is made to contact the cover 51, and the heat dissipation plate 462 is made to contact the cover 52. In this state, the heat dissipation plate 461 and the heat dissipation plate 462 are fixed to the heat dissipation member 460 by fastening the screw 451. Because both the heat dissipation plates 461 and 462 are movable in the horizontal direction by amounts corresponding to the respective lengths of the openings 461a and 462a, the heat dissipation plates 461 and 462 can more positively contact the optical engine, even in a case in which the optical engines having different widths are used. In addition, it is easier to adjust the positions of the heat dissipation plates 461 and 462 because both the heat dissipation plates 461 and 462 are movable.

Accordingly, the heat generated from the element such as the driver IC 23 and the TIA 24 is transferred to the heat dissipation plates 461 and the heat dissipation plates 462 via the cover 51 and the cover 52, respectively, and is further transferred to the heat dissipation member 460 to be released from the heat dissipation member 460.

The features and effects of the fourth embodiment are otherwise similar to the features and effects of the first embodiment described above.

According to the embodiments described above, it is possible to mount the optical engine on the mother board at a high density and with a high reliability.

Although the embodiments are numbered with, for example, "first," "second," "third," etc., the ordinal numbers do not imply priorities of the embodiments.

Further, the present invention is not limited to these embodiments, but various variations and modifications may be made without departing from the scope of the present invention.

What is claimed is:

1. An optical engine comprising:
    a substrate provided with terminals configured to connect to a connector provided on another substrate;
    a light receiver/emitter mounted on the substrate; and
    a cover in contact with and covering the light receiver/emitter, a first surface of the substrate, and a second surface of the substrate opposite to the first surface,
    wherein the light receiver/emitter is any one of a light receiver, a light emitter, and an element having functions of both the light receiver and the light emitter.

2. The optical engine as claimed in claim 1, wherein
    the cover includes a first cover covering the first surface of the substrate, and a second cover covering the second surface of the substrate, and
    the first cover and the second cover are fixed in a state sandwiching the substrate therebetween.

3. The optical module as claimed in claim 1, wherein the cover is made of an insulator.

4. The optical module as claimed in claim 1, further comprising:
    an optical waveguide arranged on the second surface of the substrate,
    wherein the light receiver/emitter is arranged on the first surface of the substrate.

5. An optical module comprising:
    a first substrate provided with connectors; and
    an optical engine, the optical engine including
        a flexible, second substrate that is provided with terminals electrically connected to the one of the connectors,
        a light receiver/emitter mounted on the second substrate, and
        a cover in contact with and covering the light receiver/emitter, a first surface of the second substrate, and a second surface of the second substrate opposite to the first surface,
    wherein the light receiver/emitter is any one of a light receiver, a light emitter, and an element having functions of both the light receiver and the light emitter.

6. The optical module as claimed in claim 5, further comprising:
    a heat dissipation member covering the optical engine that is connected to the one of the connectors; and
    a pair of heat dissipation plates in contact with the cover and sandwiching the optical engine therebetween,
    wherein the pair of heat dissipation plates are connected to the heat dissipation member.

7. The optical module as claimed in claim 5, further comprising:
    a heat dissipation member covering the optical engine that is connected to the one of the connectors; and
    a resin material filling a region surrounded by the first substrate and the heat dissipation member.

8. The optical module as claimed in claim 5, wherein the cover is made of an insulator.

9. The optical module as claimed in claim 5, further comprising:
    an optical waveguide arranged on the second surface of the second substrate,
    wherein the light receiver/emitter is arranged on the first surface of the second substrate.

* * * * *